United States Patent
Aytur et al.

(10) Patent No.: US 7,778,370 B2
(45) Date of Patent: Aug. 17, 2010

(54) FRAME SYNCHRONIZATION

(75) Inventors: Turgut Aytur, Plattsburgh, NY (US);
Stephan ten Brink, Irvine, CA (US);
Ravishankar H. Mahadevappa, Irvine, CA (US); Ran Yan, Holmdel, NJ (US)

(73) Assignee: Realtek Semiconductor Corp., Hsinchu (TW)

( * ) Notice: Subject to any disclaimer, the term of this patent is extended or adjusted under 35 U.S.C. 154(b) by 894 days.

(21) Appl. No.: 11/505,624

(22) Filed: Aug. 16, 2006

(65) Prior Publication Data
US 2007/0064744 A1 Mar. 22, 2007

Related U.S. Application Data

(60) Provisional application No. 60/709,086, filed on Aug. 16, 2005.

(51) Int. Cl.
*H04L 7/00* (2006.01)
(52) U.S. Cl. .................. 375/365; 375/354; 375/343; 375/316; 375/150; 375/142
(58) Field of Classification Search ............. 375/365, 375/354, 343, 316, 150, 142
See application file for complete search history.

(56) References Cited

U.S. PATENT DOCUMENTS

| | | | |
|---|---|---|---|
| 5,444,697 A | 8/1995 | Leung et al. | |
| 5,590,160 A | 12/1996 | Ostman | |
| 5,949,817 A | 9/1999 | Marshall | |
| 5,991,289 A | 11/1999 | Huang et al. | |
| 6,501,810 B1 | 12/2002 | Karim et al. | |
| 6,567,482 B1* | 5/2003 | Popovic' | 375/343 |
| 6,791,995 B1 | 9/2004 | Azenkot et al. | |
| 6,904,110 B2 | 6/2005 | Trans et al. | |
| 6,912,261 B2 | 6/2005 | Aslanis et al. | |
| 6,993,083 B1 | 1/2006 | Shirakata et al. | |
| 7,061,966 B2 | 6/2006 | Storm et al. | |
| 7,075,997 B1 | 7/2006 | Duncan | |
| 7,194,055 B2* | 3/2007 | Tandai et al. | 375/368 |
| 7,411,898 B2* | 8/2008 | Erlich et al. | 370/208 |
| 2006/0008035 A1 | 1/2006 | Larsson | |

FOREIGN PATENT DOCUMENTS

WO WO 2005/065035 A2 7/2005

OTHER PUBLICATIONS

International Search Report dated Apr. 9, 2007 for International Patent Application No. PCT/US06/32159, International Search Report mailed Sep. 13, 2007 (3 pgs.).
Written Opinion of the International Searching Authority dated Apr. 9, 2007 for International Patent Application No. PCT/US06/32159, Written Opinion of the International Searching Authority mailed Sep. 13, 2007 (5 pgs.).

* cited by examiner

*Primary Examiner*—Ted M Wang
(74) *Attorney, Agent, or Firm*—Thomas, Kayden, Horstemeyer & Risley, LLP

(57) ABSTRACT

Frame synchronization methods and systems suited for packet communications systems, and particularly time frequency hopping packet communication systems, are disclosed. Frame synchronization is performed by performing a first correlation on information of received symbols and performing a second correlation on results of the first correlation. In systems with repeating synchronization information modulated by a cover sequence, the results of the second correlation may be used to determine symbol numbering of symbols in a packet.

24 Claims, 10 Drawing Sheets

| TFC number | subband nb time k = 0 | k = 1 | k = 2 | k = 3 | k = 4 | k = 5 |
|---|---|---|---|---|---|---|
| 1 | 1 | 2 | 3 | 1 | 2 | 3 |
| 2 | 1 | 3 | 2 | 1 | 3 | 2 |
| 3 | 1 | 1 | 2 | 2 | 3 | 3 |
| 4 | 1 | 1 | 3 | 3 | 2 | 2 |
| 5 | 2 | 2 | 1 | 1 | 1 | 1 |
| 6 | 2 | 3 | 2 | 2 | 2 | 2 |
| 7 | 3 | 3 | 3 | 3 | 3 | 3 |

FIG. 9

FRAME SYNCHRONIZATION

CROSS-REFERENCE TO RELATED APPLICATION

This application claims the benefit of the filing date of U.S. Provisional Patent Application No. 60/709,086, filed Aug. 16, 2005, entitled "Frame Synchronization," the disclosure of which is incorporated by reference herein.

BACKGROUND

The present invention relates generally to wireless communication systems and methods, and more particularly to frame synchronization in ultrawideband orthogonal frequency division multiplexing communication systems.

Ultra-Wideband (UWB) Multi-Band Orthogonal Frequency Division Multiplex (MB-OFDM) systems transmit packets of OFDM symbols over multiple frequency sub-bands that are part of a wideband spectrum. Such wideband spectrums typically provide transmission rates up to 480 Mbps. However, given the increase in bandwidth-intensive traffic, such as data and video traffic, systems and methods for providing transmission rates greater than 480 Mbps over such spectrums are being developed. Receiving data at such high data rates in UWB MB-OFDM systems, however, may require improved techniques of frame synchronization.

In addition some proposed systems include time-frequency hopping features, features in which symbols making up a packet may be transmitted over different frequencies. Framing of a packet, for example determining a location of a symbol in a packet relative to other symbols in the packet, may be more difficult when the symbols are transmitted over time varying frequencies.

BRIEF SUMMARY OF THE INVENTION

Aspects of the invention provide frame synchronization methods and systems. In one aspect the invention provides a method for performing frame synchronization for a packet, comprising correlating information of a plurality of pairs of symbols to obtain a series comprised of a plurality of first correlation results; correlating a plurality of pairs of the series comprised of the first correlation results to obtain a series comprised of a plurality of second correlation results; and examining the series comprised of the plurality of second correlation results for a pattern indicating a known location in the packet preamble.

In another aspect the invention provides a method of performing frame synchronization, comprising for a plurality of received symbols, performing a first comparison by comparing information of a received symbol and information of a previously received symbol; performing a second comparison by comparing information of the previously received symbol with information of a further previously received symbol; performing a third comparison by comparing a result of the first comparison with a result of the second comparison; and comparing the result of comparing the result of the first comparison with the result of the second comparison with a set of first predefined value to determine if frame synchronization is achieved.

In another aspect the invention provides a system for performing frame synchronization for a packet, comprising means for correlating information of a plurality of pairs of symbols to obtain a series comprised of a plurality of first correlation results; means for correlating a plurality of pairs of the series comprised of the first correlation results to obtain a series comprised of a plurality of second correlation results; and means for examining the series comprised of the plurality of second correlation results for a pattern indicating a known location in the packet preamble.

In another aspect the invention provides a frame synchronization unit having blocks of circuitry for performing frame synchronization for a packet, the frame synchronization unit comprising a first order correlation block configured to correlate information of a plurality of pairs of symbols to obtain a series comprised of a plurality of first correlation results; a second order correlation block configured to correlate a plurality of pairs of the series comprised of the plurality of the first correlation results to obtain a series comprised of a plurality of second correlation results; and a determination block configured to examine the series comprised of the plurality of second correlation results for a pattern indicating a known location in a preamble of the packet.

In another aspect the invention provides a receiver for performing frame synchronization, the receiver comprising a radio frequency processing unit for converting the signals from analog to digital format; a signal processing unit coupled to the radio frequency processing unit the signal processing unit for determining a first plurality of samples of the symbols to be discarded and to maintain a second plurality of samples to be passed through, wherein the signal processing unit includes a frame synchronization unit having circuitry for performing frame synchronization based on a series comprised of a plurality of second correlation results derived from a series comprised of a plurality of first correlation results and a predetermined sequence indicative of the manner in which the one or more symbols were transmitted; and a Fast Fourier Transform unit coupled to the signal processing unit for receiving and transforming the second plurality of samples from time domain to frequency domain.

In another aspect the invention provides a system for performing frame synchronization, the system comprising a frame synchronization unit including a first order correlation block configured to correlate information of a plurality of pairs of symbols to obtain a series comprised of a plurality of first correlation results; a second order correlation configured to correlate a plurality of pairs of the series comprised of the plurality of the first correlation results to obtain a series comprised of a plurality of second correlation results; and a determination block configured to examine the series comprised of the plurality of second correlation results for a pattern indicating a known location in a preamble of the packet.

These and other aspects of the invention are more fully comprehended upon consideration of this disclosure, including the drawings which are part thereof.

BRIEF DESCRIPTION OF THE DRAWINGS

FIG. 9 is a table matching time frequency codes with frequency sub-band usage over time.

DETAILED DESCRIPTION

Figure 1:
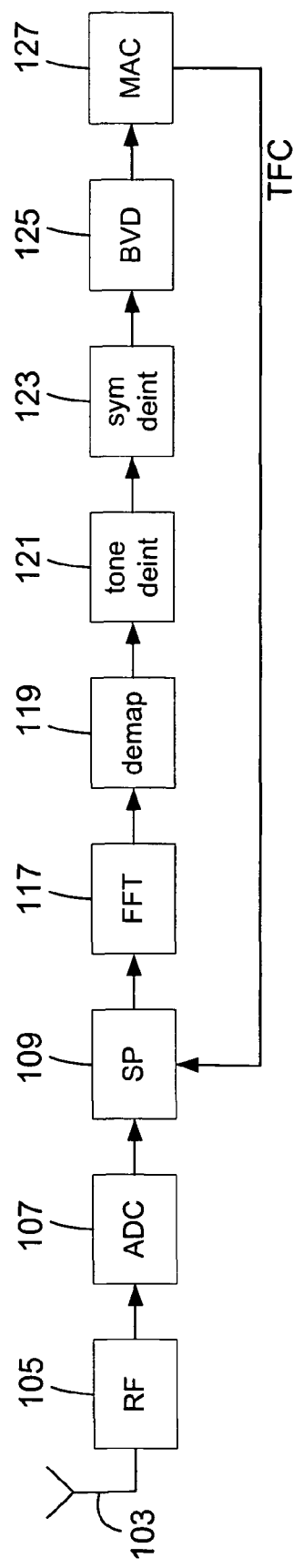
FIG. 1 is a block diagram of a receiver in accordance with aspects of the invention.

FIG. 1 is block diagram of a reception system in accordance with aspects of the invention. The reception system includes an RF receiver 105 which is configured to receive signals via an antenna 103. The RF receiver amplifies a signal received by the antenna and downconverts the signal to baseband. In various embodiments the RF receiver includes circuitry to downconvert signals at different frequencies in a time varying manner. The baseband signal is digitized by an analog-to-digital converter (ADC) 107. A signal processor 109 operates on the digitized baseband signal. The signal processor performs frame synchronization, and generally other functions associated with a signal processor such as packet detection, and null prefix removal.

The signal processor provides the time domain symbol stream to a processing chain 113. As illustrated in FIG. 1, the processing chain includes a Fast Fourier Transform (FFT) block 117, a demapper 119, a tone deinterleaver 121, a symbol deinterleaver 123, and a Viterbi decoder 125. The FFT block transforms the time domain signal to the frequency domain, the demapper recovers soft reliability bit estimates for the encoded bits of the stream, the tone deinterleaver tone deinterleaves the bit stream, and the symbol deinterleaver deinterleaves symbols from the data streams. The symbol deinterleaver also provides data blocks to a Viterbi decoder block (VD) 125, after depuncturing in some embodiments the VD decodes the data, with the output of the VD provided to the MAC 127. The MAC is configured to provide to the signal processor information regarding a time-frequency code (TFC) indicative of a time-frequency hopping pattern by which the signal, including a symbol, was transmitted.

In many embodiments the processing chain also includes circuitry for performing channel estimation and circuitry for performing phase estimation, with the results used to compensate for multipath fading channels and phase/frequency offset. In some embodiments the processing chain also includes circuitry for performing frequency and/or conjugate symmetric despreading prior to demapping by the demapper.

Figure 2:
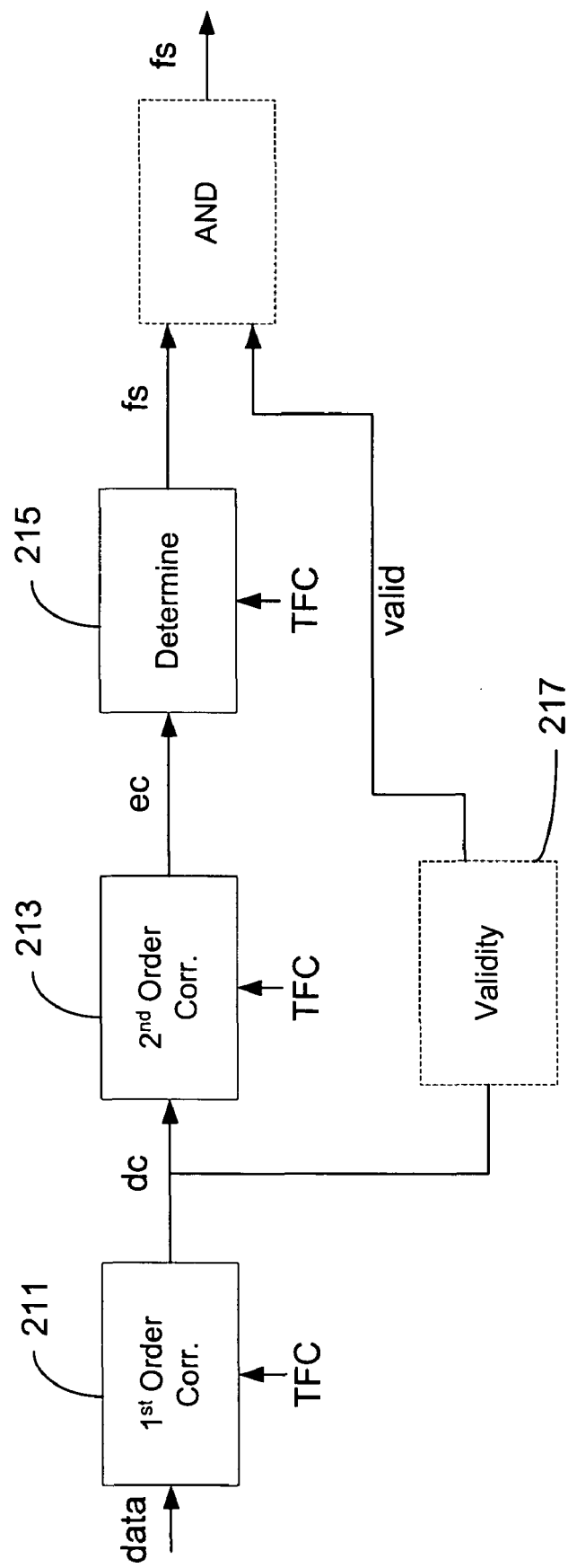
FIG. 2 is a block diagram of frame synchronization circuitry in accordance with aspects of the invention.

FIG. 2 is a block diagram of frame detection circuitry in accordance with aspects of the invention. In many embodiments the frame detection circuitry is part of a signal processor such as the signal processor 109 of FIG. 1. The frame detection circuitry includes a first order correlation block 211, a second order correlation block 213 and a determination block 215. Generally the first order correlation block correlates corresponding samples of different symbols, particularly packets preamble symbols, and the second order correlation block correlates information provided by the first order correlation block. The determination block 215 compares the results of the second order correlation with predefined sequences. In some embodiments, first correlation block 211 and second correlation block 213 are each configured to receive a TFC.

In most embodiments a packet preamble includes a number of symbols made up of predetermined sample values forming a synchronization sequence, with the symbols modulated by a cover sequence, generally comprised of 1 and −1. Thus, correlating the sample values equal to the synchronization sequence, modulated by 1, with values also equal to the synchronization sequence should result in correlation value of 1 (assuming an ideal, noiseless system). In this embodiment, a value of 1 indicates maximum correlation and a value of −1 indicates maximum lack of correlation. Conversely, correlating sample values equal to the synchronization sequence, but modulated with a −1, should result in an antipodal result, namely a correlation value of −1. Similarly, performing a delay correlation of two preamble synchronization symbols should result in a correlation value of 1, when the symbols are modulated with the same value, and a correlation value of −1, when symbols are modulated with different values (assuming an ideal noiseless system).

The first order correlation block 211 receives a stream of received data and performs a correlation on the received data. In most embodiments the correlation is a delay correlation, with the first order correlation block correlating data in the signal stream with prior data in the signal stream having a predetermined time lag. In some embodiments, the time lag is set so that the first order correlation block correlates information from corresponding portions of symbols of the received information. Accordingly, in some embodiments each symbol is comprised of 165 samples, and the correlation block compares corresponding samples of different symbols by using a time lag corresponding to 165 samples or some multiple thereof.

The first order correlation block accumulates correlation results over a window corresponding to at least a portion of the samples making up a symbol. In some embodiments, the window comprises the usable portion of the samples, with for example the window being the sample size minus the number of samples comprising guard interval samples and prefix samples.

The second order of correlation block 213 correlates outputs of the first order correlation block. In some embodiments, the first order correlation block provides separate outputs for a real part and an imaginary part of the received symbol stream, and the second order correlation block correlates the information separately for the real and imaginary portions, later combining the real and imaginary portions. The second order correlation block also may perform a delay correlation, thereby comparing a first order correlation with a prior first order correlation.

The second order of correlation block provides an indication of symbol correlations to a determination block 215. The determination block is configured to receive a signal indicative of a TFC indicative of a time-frequency hopping pattern. The determination block compares the results of a second order correlation with predefined sequences. For example, in some embodiments packets include a multiple symbol preamble in which a synchronization sequence is modulated by a sequence of 1s and −1s. Thus, the first order correlation block will indicate a higher correlation if the sliding windows compare the packet synchronization information modulated by the same cover, and will indicate a lower correlation if the packet synchronization sequence has been modulated by different covers. Similarly, the second order correlation block will indicate similar symbols with a higher value and will indicate synchronization sequences modulated by different covers with a low value.

Thus, the determination block compares a sequence provided by the second order correlation block indicating high or low values with a sequence indicating particular locations within a packet preamble. The determination block provides a frame synchronization signal (or more commonly the converse, an out-of-frame (OOF) signal) indicating whether a particular predetermined sequence indicating a particular location in a packet preamble has been found.

In some embodiments the packet synchronization circuitry also includes a validity block 217. The validity block receives results of the first order correlation and determines if the correlation is of a sufficient absolute magnitude, either indicating a high degree of matching or a low degree of matching.

The output of the validity block and the determination block are received by an AND circuit 219. In embodiments including the validity block, the frame synchronization signal is set if both the determination block indicates the preamble sequence has been found and the validity block indicates that the first order correlations are of sufficiently magnitude.

In some embodiments the samples are transmitted according to a time-frequency interleaved protocol such as frequency-hopped OFDM. The center frequency of each transmitted OFDM symbol in a received packet may change over time, as dictated by the TFC according to which it was transmitted. For example, each of seven different logical channels may define a frequency hopping pattern i.e., a TFC. FIG. 9 illustrates embodiments of TFCs for a group of sub-bands including sub-bands 1, 2 and 3 in an ultrawideband in which each time unit k corresponds to the time at which time samples corresponding to an OFDM symbol are transmitted on a particular sub-band. The logical channels make use of the frequency sub-bands, with any one logical channel using at most a single frequency sub-band at a time. In various embodiments a TFC may incorporate fewer or greater number of sub-bands and the TFC may involve different time-frequency interleaved patterns across the set of sub-bands. Notably, however, in many embodiments a different cover sequences are used for different TFC's or different groups of TFCs. Exemplary cover sequences are provided in Tables 1 and 2, discussed later.

In some embodiments correlation is performed on symbols received on the same sub-band. This may be implemented by selecting a time log D between samples being correlated. The value for time lag D is determined based on the time-frequency code by which the OFDM symbols are being transmitted. For example, for TFC=1 or 2, D is 495 samples at 528 MHz (i.e., the length of 3 OFDM symbols including null prefix and guard interval samples). As illustrated in FIG. 2, for TFC=1 or 2, every 3 OFDM symbols is transmitted on the same subband. Accordingly, the delay correlation is performed for every third OFDM symbol transmitted to the receiver, i.e., every symbol received on a particular subband.

For example for TFC=3, 4, D=165 samples at 528 MHz (i.e., the length of 1 OFDM symbol including null prefix and guard interval samples). As illustrated in FIG. 2, for TFCs 3 and 4, the period over which an OFDM symbol is received on a subband is not constant as the period between symbols received is 1 symbol for selected OFDM symbol transmissions and 5 symbols for other OFDM symbol transmissions. In this embodiment, a first order correlation is calculated for every symbol transmitted to the receiver, with the results discarded for cases when the comparison is between symbols received on different subbands, and a second order correlation is calculated between every six results of first order correlation. As a result, the correlation is performed between first and second symbols wherein the second symbol is six symbols after the first symbol.

In another embodiment in which TFC=5, 6 or 7, D=165 samples at 528 MHz (i.e., the length of 1 OFDM symbol including null prefix and guard interval samples). As illustrated in FIG. 2, for TFCs 5, 6 or 7, the period over which an OFDM symbol is received on a subband is 1 symbol. In this embodiment, a delay correlation is therefore calculated between every pair of symbols received as all are received on the same subband in this embodiment.

Figure 3:
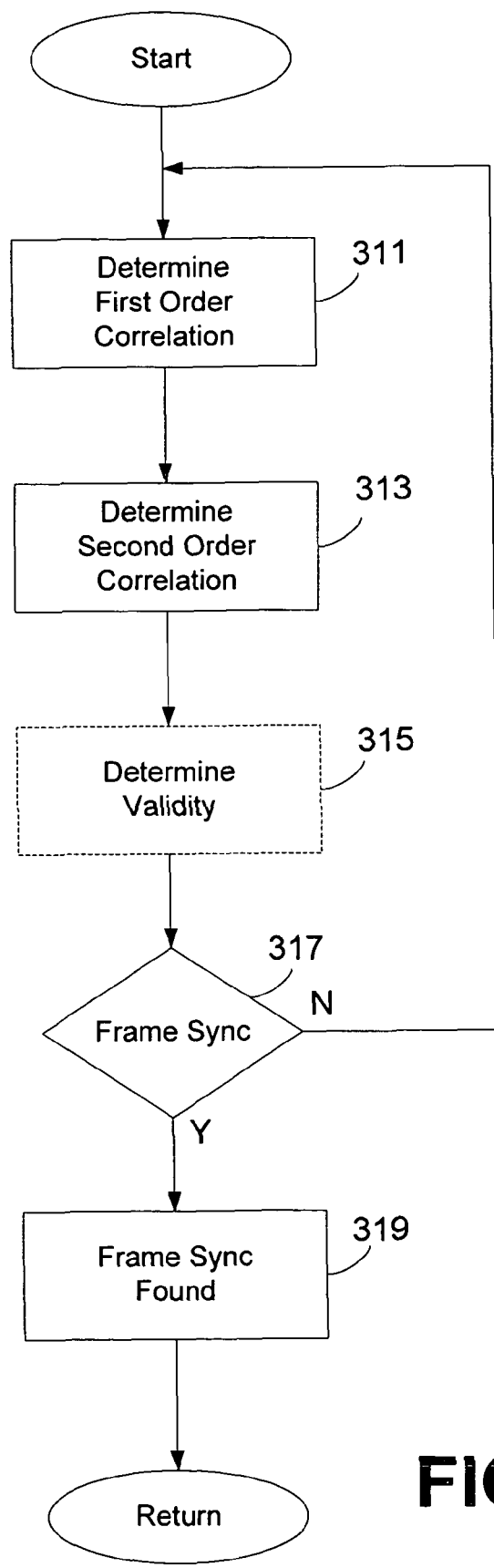
FIG. 3 is a flow diagram of a process for performing frame synchronization in accordance with aspects of the invention.

FIG. 3 is a flow diagram of one embodiment of a method of performing frame synchronization in accordance with aspects of the invention. The method may be performed by a receiver such as described in FIG. 1, for example by the signal processor 111, or by circuitry such as the circuitry of FIG. 2. For example, information may be stored in memory of the receiver and the signal processor 111 may be configured, either by program instructions or by circuitry, to perform calculations using the information and to store, in the memory, results of calculations and retrieve results previously stored.

In the context of a packet-based OFDM communication system, frame synchronization is performed to determine OFDM symbol numbering within a packet. The OFDM symbol numbering provides information such as relative timing of channel estimation symbols or data symbols. For example, in most embodiments 165 samples are received at a receiver for an OFDM symbol. Of these samples, 128 samples are data samples meant to be transformed to the frequency domain by an FFT block, with 32 samples comprising a null prefix and 5 samples comprising a guard interval. The guard symbols are generally positioned to allow time for frequency hopping by a receiver, and are expected to be invalid and are not used. The null prefix may be used in an overlap and add operation, improving FFT processing, but usually are not otherwise used.

Generally, the process of FIG. 3 determines a first correlation using information from received symbols, determines a second correlation using results of the first correlation, optionally determines validity of the correlations, and determines whether the correlations indicate a predefined location of symbols in a packet. The correlations may each be considered of measure of the sameness (or difference) of the information in the received symbols, and may therefore be considered a derivative of the received information. Thus, the first correlation may be considered to provide a first derivative of the received information, and the second correlation may be considered to provide a second derivative of the received information.

Referring to FIG. 3, in block 311 the process determines a first correlation of information in received symbols. In some embodiment this is performed by comparing information of the received symbols with predefined information. In some embodiments, however, the process determines the first correlation by comparing information of a first received symbol with information of a prior received symbol. In some embodiments the received symbol and the prior received symbols are packet synchronization symbols of a packet preamble. The symbols may be received adjacent in time. In many embodiments, however, particularly in time-frequency hopping systems, the received symbol and the prior received symbol are packet preamble symbols for the same packet that are received on the same sub-band.

In one embodiment the first correlation is accomplished by comparing samples of a received symbol with samples of the prior received symbol. For complex samples, such as samples including both I-channel information and Q-channel information, this may be accomplished, for example, by multiplying a sample of one of the symbols with the complex conjugate of a corresponding sample of the other of the symbols, with the magnitude of the result of the multiplication indicating a measure of similarity of the samples. This result is accumulated over a sliding window. The window may cover the number of samples that make up a symbol, or may be the number of samples that are to be used for FFT purposes. It is convenient to separately sum the real and imaginary portions of the results of the multiplication separately.

In some embodiments preamble symbols of a packet include packet synchronization symbols, with the packet synchronization symbols including the same information, modulated with a cover sequence of 1s and −1s. Thus, comparison of packet synchronization symbols both modulated with 1 or −1 should indicate a high degree of matching. Similarly, comparison of a packet synchronization symbol modulated with a 1 and a packet synchronization symbol modulated with a −1 should indicate a high degree of difference.

In block 313 the process determines a second correlation of information in received symbols. In some embodiments this is performed by comparing an accumulated result of the first correlation for a symbol with a previously determined accumulated result for a prior symbol. For example, an accumulated result of processing on a first symbol and a second symbol may be compared with an accumulated result of processing on the second symbol and a third symbol. Generally the first symbol is the most recently received symbol (of the first, second, and third symbols), the second symbol is the symbol received immediately prior to the first symbol, and the third symbol is the symbol received immediately prior to the second symbol. Of course, in some embodiments, the symbols may be limited to symbols provided on a single sub-band of a frequency hopping system, and intervening symbols may be received on other sub-bands or on the same subband from unrelated transmitters.

In some embodiments the second correlation is performed by multiplying an accumulated real portion of one first correlation result with the accumulated real portion of another first correlation result, with the imaginary portions likewise multiplied together. The results of the two multiplication results are then combined. In some embodiments the results are combined by way of addition.

In block 315 the process optionally determines validity of the correlation results. For example, in one embodiment the process determines if a magnitude of a first order correlation result is greater than some preset or programmable value, or if a real or imaginary accumulated result of the first order correlation is greater than some preset or programmable value. In another embodiment the process determines if first order correlation results for a number of results, such as a number of correlation results to be used for frame synchronization purposes, is greater than some preset or programmable value.

In block 317 the process determines if a plurality of second correlation results indicates a particular location in a packet. For example, in some embodiments a packet preamble includes symbols formed of repeating information modulated with a cover sequence, with the cover sequence for example being formed of 1 and −1. Thus, received symbols of a packet preamble would be expected to be the same in known locations and to differ in known locations based on the cover sequence, and the first derivative and the second derivative of symbols in the packet preamble would likewise be expected to be the same in some known locations and to differ in some known locations. Accordingly, in some embodiments a sequence of results of the second correlation are compared with a sequence of values indicating the expected results of the correlations on a packet synchronization symbols of a packet preamble.

If the determination of block 317 indicates a particular location in a packet, the process determines the location of the symbols in the packet, and thereafter returns. Otherwise the process returns to block 311.

Figure 4:
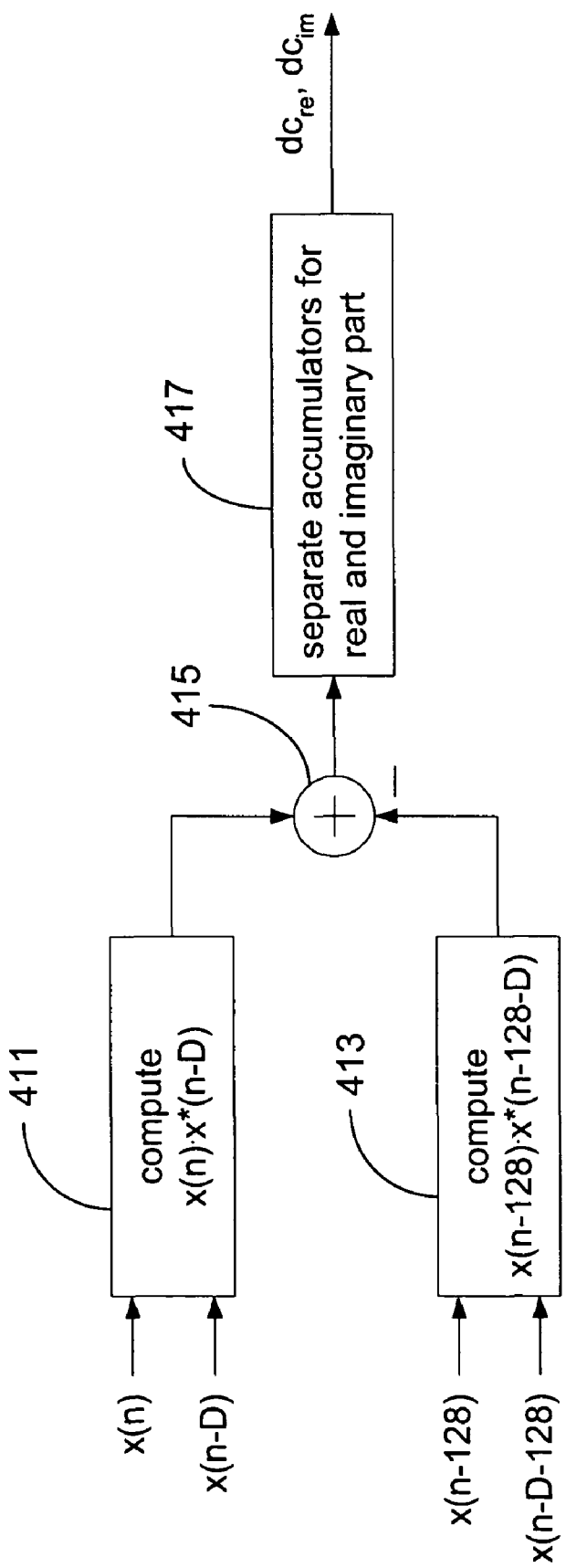
FIG. 4 is a block diagram of a correlator useful as a first order correlator in accordance with aspects of the invention.

FIG. 4 is a block diagram of a first order correlator in accordance with aspects of the invention. In most embodiments the correlator is implemented in circuitry, although in some embodiments the correlator is implemented in a processor configured to execute the functions of the correlator. In one embodiment, the correlator performs the method of block 311 of FIG. 3, and in some embodiments forms the first order correlator of FIG. 2.

As illustrated in FIG. 4 the correlator is a delay correlator, operating over a sliding window. The delay correlator determines a measure of correlation between a received symbol and a complex conjugate of a previously received symbol. In one embodiment, the received and the symbol previously received symbol are packet preamble symbols both received on the same sub-band in a frequency hopping system.

As illustrated in FIG. 4, the delay correlator includes a first correlator 411, a second correlator 413, a difference block 415 and an accumulator 417.

The first correlator performs a correlation between pairs of received symbols. The first correlator correlates a sample of a received symbol, $x(n)$, with the complex conjugate of a sample of a previously received symbol, $x^*(n-D)$. The received symbol, $x(n)$, is received a time lag D after sample $x(n-D)$ is received.

In one embodiment, the value of D is chosen so that the sample $x(n)$ corresponds to the same sample of the previously received symbol received on the same subband for a particular TFC. For example, in some embodiments, every symbol includes 165 samples and every third received symbol is received on the same subband for a particular TFC. Accordingly, D=495 samples, so that the delay correlation is performed between corresponding samples of the received symbols. In other embodiments, every received symbol may be received on the same subband. Accordingly, for 165 samples per symbol, D=165, so that the delay correlation is performed corresponding samples of the received symbols.

In yet another embodiment, when TFC=3 or 4, D=165 samples and the correlation is performed between the $x(n)$ samples and the corresponding samples of the previously received symbol. However, in this embodiment, correlating the $x(n)$ samples with samples of the previously received symbol creates a correlation between symbols received on different subbands in some cases. These correlations may yield invalid delay correlations. The invalid results are later substituted with prior valid delay correlation as discussed with regard to FIG. 7. The correlation is performed by multiplying the values of the $x(n)$ and the $x^*(n-D)$ samples.

In some embodiments of the invention, the correlation is performed over samples forming an FFT window of a received symbol. For example, each symbol may include 128 data samples followed by 37 null value samples constituting a guard interval and prefix (which may be actually a postfix). Accordingly, the delay correlation is performed over 128 values of n for $x(n)$ and $x^*(n-D)$. The values of the correlations are summed and the real and imaginary parts of the sum are output from the first correlator to the difference block 615. One skilled in the art can appreciate that in other embodiments of the invention, the number of correlated samples may differ from 128.

The delay correlator performs correlation over a sliding window. Depending on the implementation, results of the past 128 correlations may be simply summed upon processing of each new sample. As illustrated in FIG. 3, however, the delay correlator includes a second correlator, with the second correlator used to determine values moving outside the window. As the first correlator determines $x(n)x^*(n-D)$, for a window of, for example, 128 samples, the second correlator determines $x(n-128)x^*(n-D-128)$. The second correlator sums the values of the correlations and outputs the real and imaginary parts of the sum to the difference block 415.

The difference block 415 computes the difference between the real and imaginary parts of the first correlator output and the second correlator output to implement the sliding window of the delay correlator. The operation of the difference block 415 may be performed in any number of ways. By way of example but not limitation, the difference block 415 removes the contribution to the running correlation computed in block 411 by the contribution from the prior correlation after the accumulator block 417 accumulates the real and imaginary parts of the delay correlation. The pair of the real part and the imaginary parts of the output of the difference block 615 may be referred to as the delay correlation, for convenience labeled $dc_{re}$ and $dc_{im}$, respectively.

Figure 5:
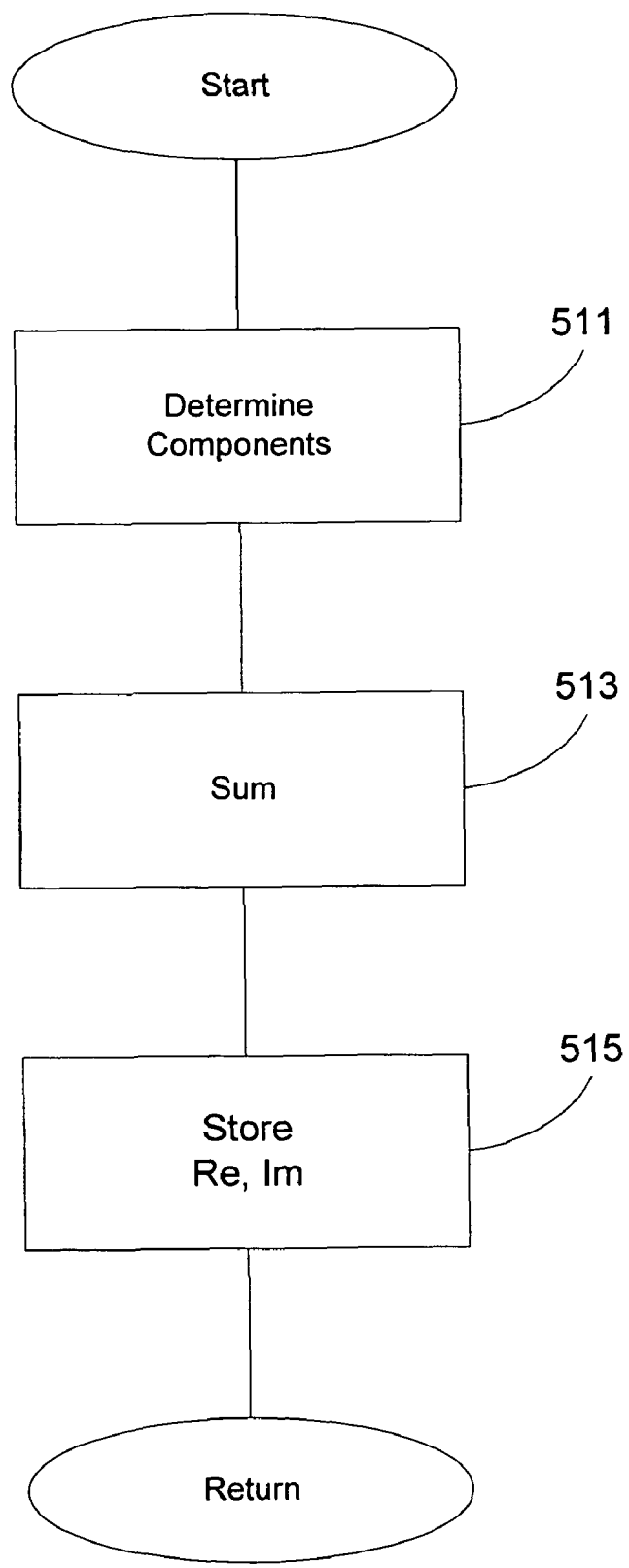
FIG. 5 is a flow diagram of a process for performing a first order correlation in accordance with aspects of the invention.

FIG. 5 provides a flow diagram of an embodiment of a process of performing a first order correlation. In block 511 a sample of a received OFDM symbol, x(n), is multiplied by a complex conjugate version of a sample with time lag, or delay, D, x*(n−D). In order to implement a sliding window of accumulated values a product of samples exiting the window, e.g., x(n−128) and x*(n−128−D) for a window including 128 samples, is also computed. In block 513 the product of x(n) x*(n−D) is added to an accumulated value and x(n−128)x* (n−128−D) is subtracted from the accumulated value. In block 515 the real and imaginary parts of the accumulated values are stored. The result generated is a delay correlation, e.g., a first-order autocorrelation with real and imaginary components, again for convenience considered $dc_{re}$ and $dc_{im}$, respectively.

Figure 6:
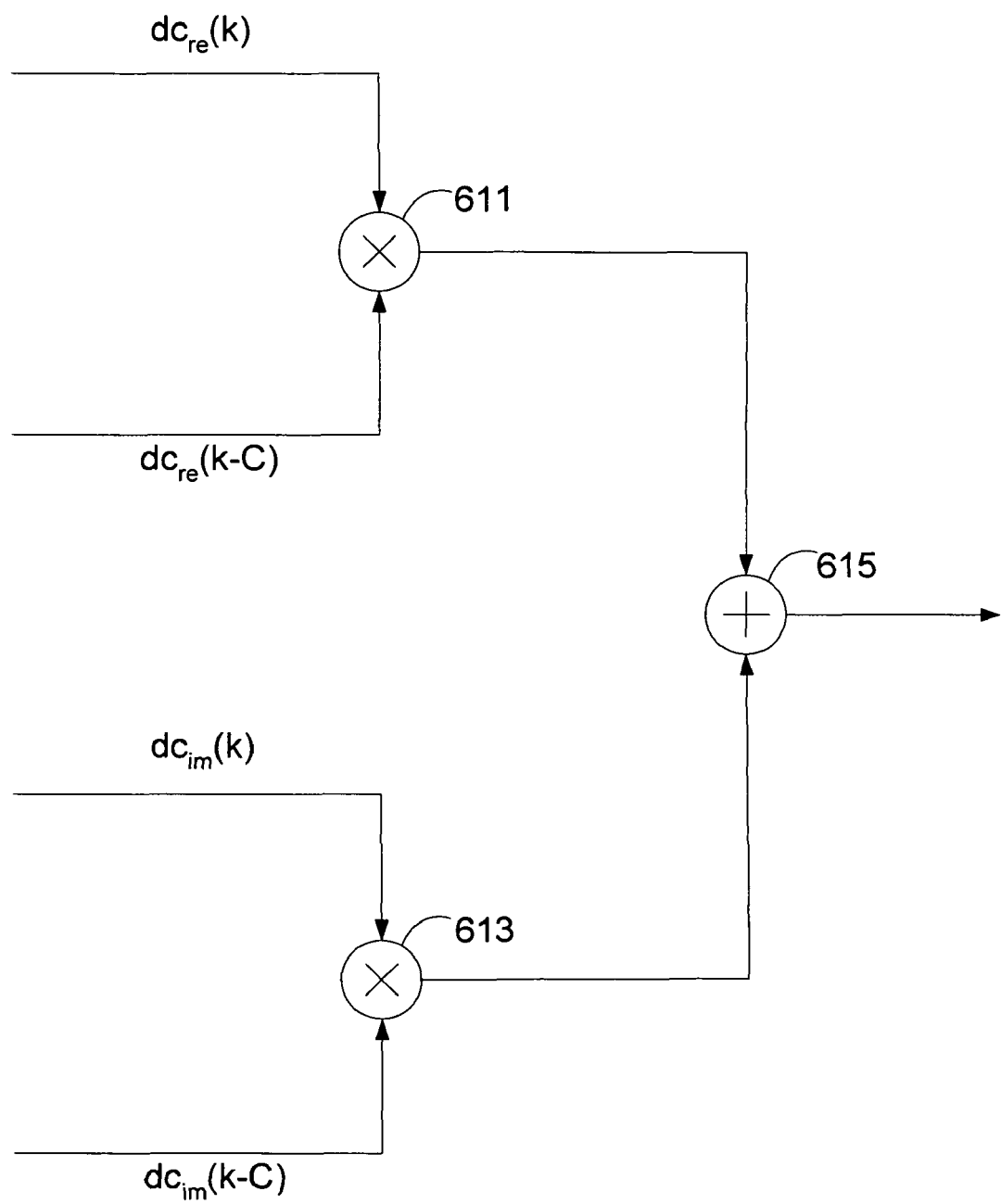
FIG. 6 is a block diagram of a correlator useful as a second order correlator in accordance with aspects of the invention.

FIG. 6 is a block diagram of a second-order correlator in accordance with aspects of the invention. The second order correlator, as illustrated, receives a real and an imaginary part of results of a first order correlation, $dc_{re}(k)$ and $dc_{im}(k)$. The second order correlator also receives a prior result of a first order correlation, again in real and imaginary parts, $dc_{re}(k-C)$ and $dc_{im}(k-C)$. In the foregoing the symbol k indicates an OFDM symbol index, with the complex samples from the first order correlator updated every OFDM symbol. Similarly, the symbol C indicates a time lag, in OFDM symbols. Non-frequency hopping systems have a time lag C as simply one OFDM symbol. In frequency hopping systems the time lag C may correspond to a time delay such that the previously calculated first order correlation result is for a symbol received on the same subband.

The real parts $dc_{re}$ are multiplied together in a multiplier 611. Similarly, the imaginary parts $dc_{im}$ are multiplied together in a multiplier 613. In some embodiments the multipliers may be viewed as providing a simple frequency offset compensation, for example as an attempt to compensate for frequency offset between a transmitter and a receiver. The output of the multipliers are combined together in block 615, with the output of block 615 indicating a second order correlation result. In some embodiments the combination is performed as an addition.

Figure 7:
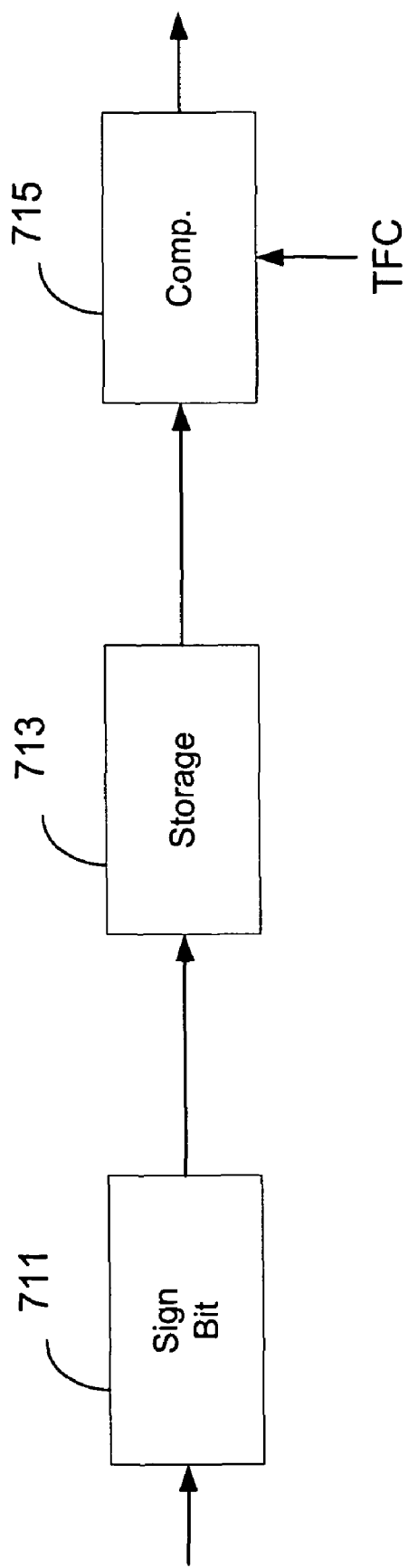
FIG. 7 is a block diagram of a determination block.

FIG. 7 is a block diagram of a determination block. The determination block includes sign bit block 711, storage block 713 and comparator 715.

Block 711 receives the output of the second order correlator. Block 711 extracts the sign bit of the second order correlation and provides the sign bit to storage 713.

Thus, the sign bit, s(k), may be viewed as extracted from each frequency offset-compensated second-order autocorrelation, dcf2(k), and a predetermined number of sign bits are stored in the buffer. In one embodiment, five sign bits corresponding to the previous five computed second-order autocorrelations are stored in the buffer.

For embodiments using TFCs 3 and 4, some sign bits, such as sign bits s(k−3) and s(k−1), which are extracted from the second-order autocorrelation results dcf2(k−3) and dcf2(k−1), may be invalid due to the frequency hopping. For these TFCs, the sign bits s(k−3) and s(k−1) are substituted with the corresponding sign bits for first-order correlation results $dc_{re}$(k−2) and $dc_{re}(k)$.

Storage block 713 receives the output sign bit of block 711. A comparator block 715 compares a series of the stored sign bits with predetermined sequences. In some embodiments, the predetermined sequences are time frequency code dependent. Accordingly, in some embodiments, comparator block 715 is configured to receive a TFC. In other words, in some embodiments different preamble cover sequences are used for different symbols transmitted using different time frequency codes. The comparator therefore examines the sequence of sign bits to determine if the predetermined sequence has been located. Accordingly, in embodiments of the present invention, frame synchronization is able to be achieved by cross-correlating the OFDM symbols with a mere fragment of the second derivative, e(k), of the cover sequence. In most embodiments the fragment is a series of five bits.

Figure 8:
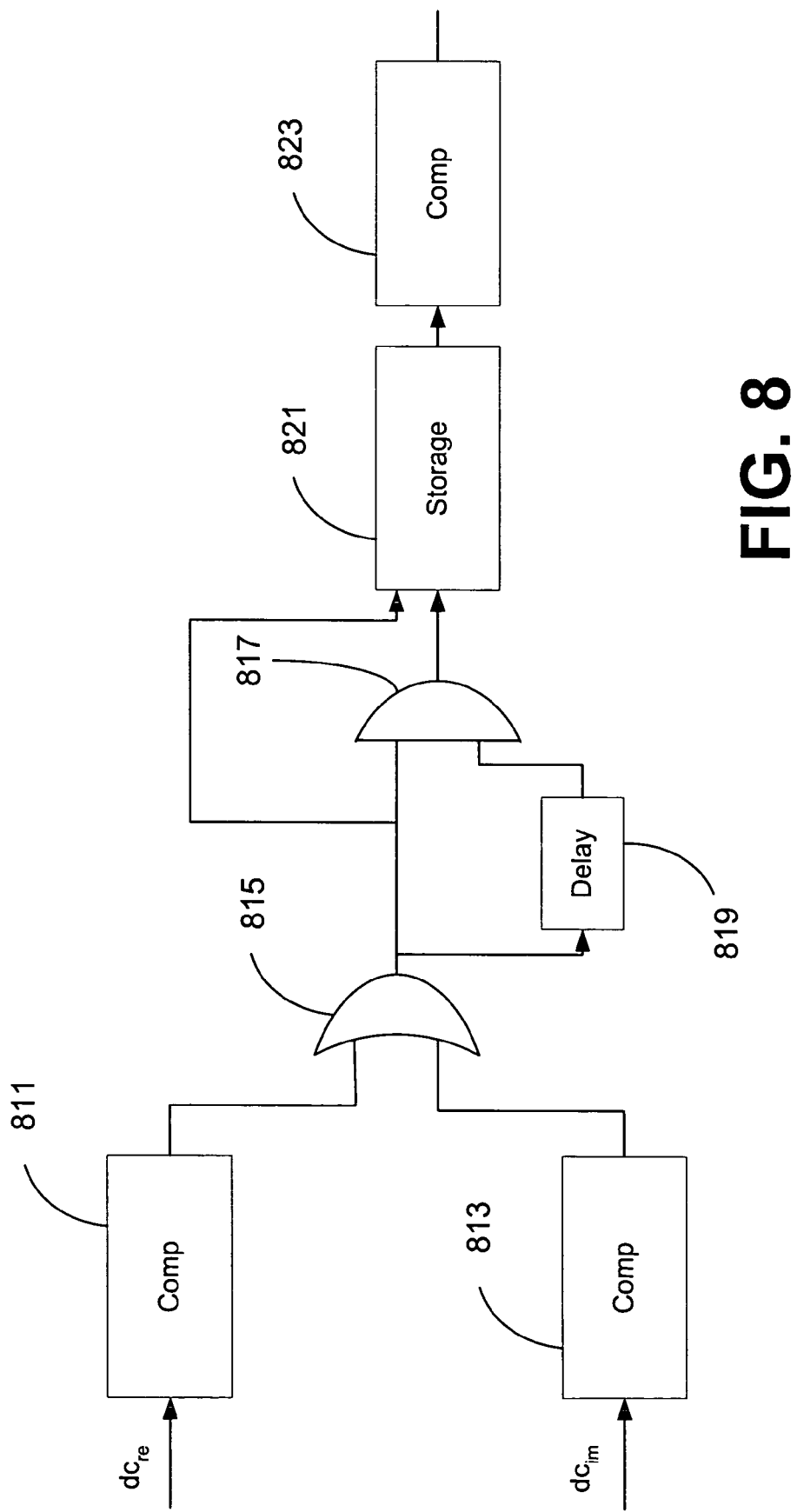
FIG. 8 is a block diagram of correlator validity circuitry in accordance with aspects of the invention.

FIG. 8 is a block diagram of an embodiment of a validity block in accordance with aspects of the invention. A validity block includes a first comparator 811 and a second comparator block 813. The first comparator block compares a real part of the first order correlation with a threshold. In some embodiments the comparator block compares an absolute magnitude of the real part with the threshold. Similarly, the second comparator block 813 compares an imaginary portion of a first order correlation with a threshold. In many embodiments the threshold used by the second comparator block 811 and the comparator block 813 are the same threshold, and in some embodiments is programmable by use of a programmable register.

The outputs of the comparators are provided to an OR gate 815. The output of the OR gate is high, indicating that results of the first order correlation are valid, if either of the absolute value of the real portion or the absolute value of the imaginary portion are greater than the threshold The output of the OR gate is provided to an AND block 817 and to a delay block 819. The delay block 819 implements a delay of C OFDM symbols. In non-frequency hopping systems, the value of C is equal to 1, namely the results for each OFDM symbol are maintained. In frequency hopping systems the value of C instead equal to the number of symbol periods at which symbol reception on a particular subband repeats. The output of the delay block is also provided to the AND block 817. Accordingly, the AND block determines if both a current first order correlation is valid and a prior first order correlation is valid. The output of the AND block is stored, on a per symbol basis, in a storage 821. This storage therefore maintains a sequence of validity indicators of the first order correlation. In some embodiments, the storage includes at least sufficient storage for the number of items in the predetermined sequence used in determining frame synchronization. A comparator 823 determines if the stored indicators indicate valid correlation results.

In some embodiments, such as for TFCs 3, 4, due to the frequency hopping, the values mg(k−3) and mg(k−1), are invalid, and the corresponding results, dc_good(k−2) and dc_good(k), are used instead.

Thus, a cross-correlation may be performed between the sign bits and a fragment of a second derivative, e(k), of a cover sequence, c(k), used to modulate packet preamble symbols.

Tables 1 and 2 illustrate embodiments of cover sequences and their first and second derivatives corresponding to the TFCs illustrated in FIG. 9. Accordingly, Tables 1 and 2 should be read in conjunction with FIG. 9 since the derivatives of the cover sequences are defined with respect to the receipt of a transmitted symbol on a particular sub-band.

TABLE 1

| OFDM symbol index k | cover sequence number 1 (for TFCs 1, 2) | | | cover sequence number 2 (for TFCs 3, 4) | | | cover sequence number 3 (for TFCs 5, 6, 7) | | |
|---|---|---|---|---|---|---|---|---|---|
| | preamble cover sequence c(k) | first derivative: d(k) = c(k) · c(k − 3) | second derivative: e(k) = d(k) · d(k − 3) | preamble cover sequence c(k) | first derivative: d(k) = c(k) · c(k − 1) | second derivative: e(k) = d(k) · d(k − 6) | preamble cover sequence c(k) | first derivative: d(k) = c(k) · c(k − 1) | second derivative: e(k) = d(k) · d(k − 1) |
| 0 | 1 | | | 1 | | | −1 | | |
| 1 | 1 | | | 1 | 1 | | −1 | 1 | |
| 2 | 1 | | | 1 | x | | −1 | 1 | 1 |
| 3 | 1 | 1 | | 1 | 1 | | −1 | 1 | 1 |
| 4 | 1 | 1 | | 1 | x | | −1 | 1 | 1 |
| 5 | 1 | 1 | | 1 | 1 | | −1 | 1 | 1 |
| 6 | 1 | 1 | 1 | 1 | x | | −1 | 1 | 1 |
| 7 | 1 | 1 | 1 | 1 | 1 | 1 | 1 | −1 | −1 |
| 8 | 1 | 1 | 1 | 1 | x | x | −1 | −1 | 1 |
| 9 | 1 | 1 | 1 | 1 | 1 | 1 | −1 | 1 | −1 |
| 10 | 1 | 1 | 1 | 1 | x | x | 1 | −1 | −1 |
| 11 | 1 | 1 | 1 | 1 | 1 | 1 | −1 | −1 | 1 |
| 12 | 1 | 1 | 1 | 1 | x | x | −1 | 1 | −1 |
| 13 | 1 | 1 | 1 | 1 | 1 | 1 | 1 | −1 | −1 |
| 14 | 1 | 1 | 1 | 1 | x | x | −1 | −1 | 1 |
| 15 | 1 | 1 | 1 | 1 | 1 | 1 | −1 | 1 | −1 |
| 16 | 1 | 1 | 1 | 1 | x | x | 1 | −1 | −1 |
| 17 | 1 | 1 | 1 | 1 | 1 | 1 | −1 | −1 | 1 |
| 18 | 1 | 1 | 1 | 1 | x | x | −1 | 1 | −1 |
| 19 | 1 | 1 | 1 | −1 | −1 | −1 | 1 | −1 | −1 |
| 20 | 1 | 1 | 1 | 1 | x | x | −1 | −1 | 1 |
| 21 | −1 | −1 | −1 | −1 | −1 | −1 | 1 | −1 | 1 |
| 22 | −1 | −1 | −1 | 1 | x | x | 1 | 1 | −1 |
| 23 | −1 | −1 | −1 | −1 | −1 | −1 | 1 | 1 | 1 |
| 24 | 1 | x | x | 1 | x | x | 1 | x | x |
| 25 | 1 | x | x | 1 | 1 | −1 | 1 | 1 | x |
| 26 | 1 | x | x | 1 | x | x | 1 | 1 | 1 |
| 27 | 1 | 1 | x | 1 | 1 | −1 | 1 | 1 | 1 |
| 28 | 1 | 1 | x | 1 | x | x | 1 | 1 | 1 |
| 29 | 1 | 1 | x | 1 | 1 | −1 | 1 | 1 | 1 |

TABLE 2

| OFDM symbol index k | cover sequence number 1 (for TFCs 1, 2) | | | cover sequence number 2 (for TFCs 3, 4) | | | cover sequence number 3 (for TFCs 5, 6, 7) | | |
|---|---|---|---|---|---|---|---|---|---|
| | preamble cover sequence c(k) | first derivative: d(k) = c(k) · c(k − 3) | second derivative: e(k) = d(k) · d(k − 3) | preamble cover sequence c(k) | first derivative: d(k) = c(k) · c(k − 1) | second derivative: e(k) = d(k) · d(k − 6) | preamble cover sequence c(k) | first derivative: d(k) = c(k) · c(k − 1) | second derivative: e(k) = d(k) · d(k − 1) |
| 0 | 1 | | | 1 | | | −1 | | |
| 1 | 1 | | | 1 | 1 | | −1 | 1 | |
| 2 | 1 | | | 1 | x | | −1 | 1 | 1 |
| 3 | 1 | 1 | | 1 | 1 | | 1 | −1 | −1 |
| 4 | 1 | 1 | | 1 | x | | 1 | 1 | −1 |
| 5 | 1 | 1 | | 1 | 1 | | −1 | −1 | −1 |
| 6 | 1 | 1 | 1 | 1 | x | | −1 | 1 | −1 |
| 7 | 1 | 1 | 1 | −1 | −1 | −1 | 1 | −1 | −1 |
| 8 | 1 | 1 | 1 | 1 | x | x | −1 | −1 | 1 |
| 9 | −1 | −1 | −1 | −1 | −1 | −1 | 1 | −1 | 1 |
| 10 | −1 | −1 | −1 | 1 | x | x | 1 | 1 | −1 |
| 11 | −1 | −1 | −1 | −1 | −1 | −1 | 1 | 1 | 1 |
| 12 | 1 | −1 | 1 | 1 | x | x | 1 | 1 | 1 |
| 13 | 1 | −1 | 1 | 1 | 1 | −1 | 1 | 1 | 1 |
| 14 | 1 | −1 | 1 | 1 | x | x | 1 | 1 | 1 |
| 15 | 1 | 1 | −1 | 1 | 1 | 1 | 1 | 1 | 1 |
| 16 | 1 | 1 | −1 | 1 | x | x | 1 | 1 | 1 |
| 17 | 1 | 1 | −1 | 1 | 1 | −1 | 1 | 1 | 1 |

Table 1 illustrates cover sequences for packets that have a long preamble and Table 2 illustrates cover sequence values and corresponding first and second derivatives for packets having a short preamble. Tables 1 and 2 illustrate one embodiment of a cover sequence, corresponding first and corresponding second derivative. Other cover sequences and corresponding first and second derivatives are also possible.

The corresponding symbol values for e(k) with which sign bits are cross correlated depends on whether the packet in which the received OFDM symbols are located has a long or a short preamble. In one embodiment in which five sign bits are buffered, the last five values of e(k) are correlated with the sign bits. Accordingly, symbol values k=19, . . . , 23 are used for long preambles and symbol values k=7, . . . , 11 are used for short preambles. For example, with reference to Table 1, for TFCs 1, 2, if −1 represents a 0 value bit, and 1 represents a 1 value bit, the portion e(k) correlated with sign bits is {1,1,0,0,0}. the corresponding fragments of e(k) are identical whether the preamble is long or short. In one embodiment, a cross-correlation between the two sequences is performed by performing an exclusive-or operation between corresponding symbol values for the sequences. In other embodiments, the similarity between the sequences may be determined in any suitable fashion.

As shown in Tables 1 and 2, for TFC 3, 4, some entries of the e(k) fragments are invalid results (indicated with an "x") due to frequency hopping. An invalid result occurs due to an autocorrelation of results c(k) or d(k) on two different subbands. In one embodiment a 0 bit is inserted in the e(k) sequence at the symbol locations corresponding to the invalid results. Next the sign bits are compared with the fragment of e(k). In one embodiment, a cross-correlation is performed. In other embodiments, other methods of comparing the sign bits with the fragment of e(k) may be employed.

In an alternative embodiment, a reception system employing two receiver antennas can be used to improve the reliability and accuracy of the frame synchronization found-signal. Each receiver antenna can be in connection with an RF processing chain with separate down-conversion from RF to baseband, a separate ADC and digital baseband processing with separate delay correlations, working on the different ADC outputs from the two receive antennas. In embodiments of the present invention, this may be accomplished, for example, as follows. Two frequency offset-compensated second-order autocorrelation results, $dcf2_1(k)$ and $dcf2_2(k)$, from receiver antenna 1 and 2, respectively, can be added together. The subsequent processing (sign bit extraction, applying a window of results from the past five OFDM symbols and cross-correlation with a fragment of a second derivative of a cover sequence) is performed on the sum as previously described.

The reliability indicators, $mg_1(k)$ and $mg_2(k)$, from antennas 1 and 2, respectively, may also be combined using a logical OR operation. Thus, in this embodiment, it is sufficient that only one delay correlator output i.e. only one first-order autocorrelation, from either receiver antenna, is reliable. The subsequent processing (applying a window of results from the past five OFDM symbols) is performed over the combined result, as described in the previous section. The benefits of multi-chain processing can be extended for any number of receive antennas.

Figure 10:
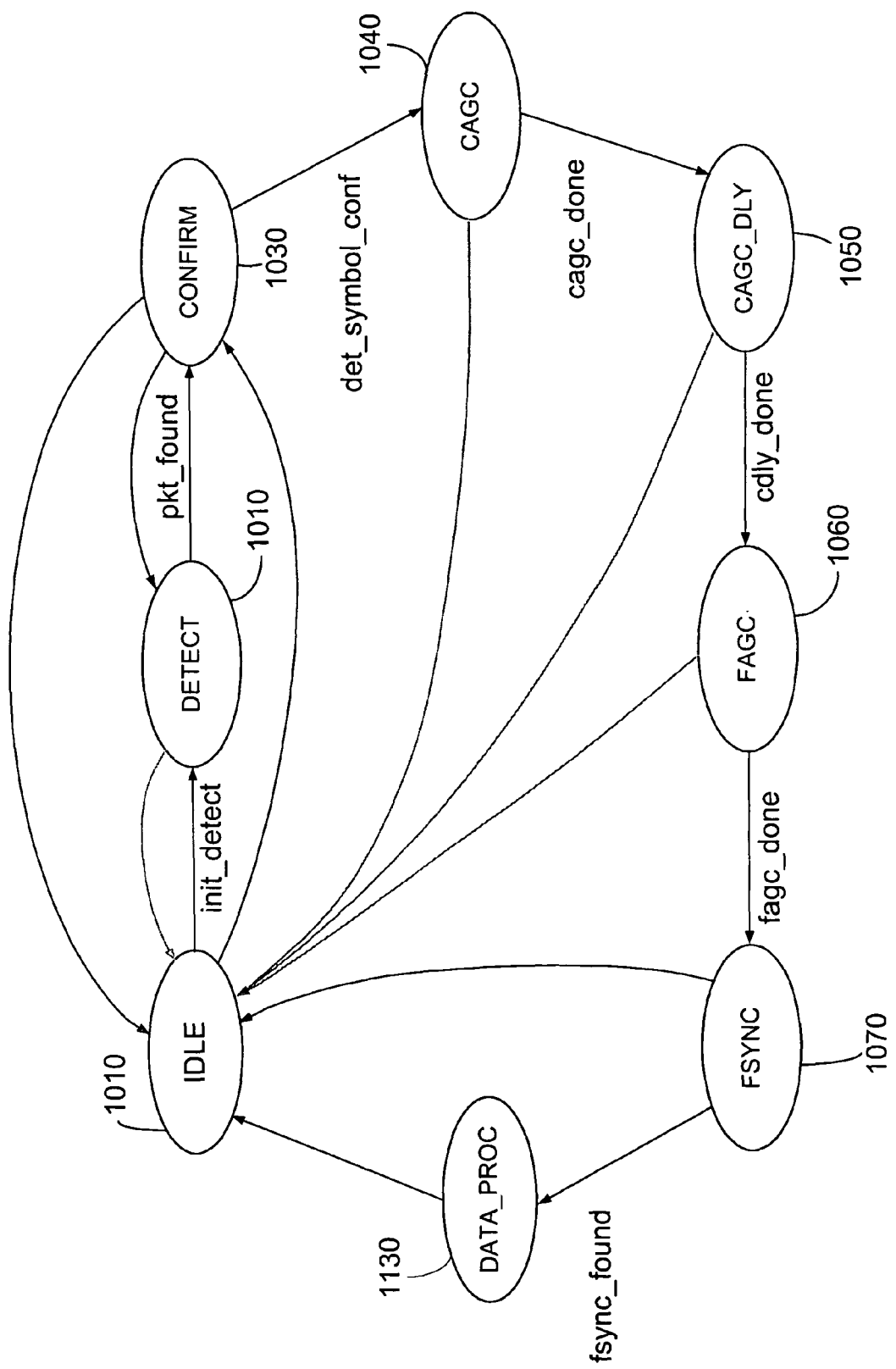
FIG. 10 is a state diagram of operation of a receiver in accordance with aspects of the invention.

FIG. 10 is a state diagram of the method of operation of the reception system of FIG. 1 in accordance with aspects of the invention. The system may be in any one of seven states, including an idle state 1010. The system moves from the idle state 1010 to the detect state 1020 to attempt to detect a received packet.

If a packet is detected, the presence of the packet is confirmed in the confirm state 1030. After an initial cross-correlation peak has been detected in the detect state 1020, further processing employing additional calculated cross-correlations, energy computations and thresholding is used to confirm the initial detection. If a packet is not detected while in the confirm state 1030, the receiver moves back to the detect state 1020.

After confirming the detection of a packet, the receiver moves to the coarse AGC state 1040 during which coarse AGC is performed. If the packet detection can not be confirmed, the receiver moves from the confirm state 1030 to the idle state 1010. After coarse AGC is completed, the receiver moves to the coarse AGC delay state 1050. After waiting a designated amount of delay, the receiver moves into the fine AGC state 1060. Coarse AGC and fine AGC are performed using the cross-correlation and energy computation results previously computed. A corresponding control signal is generated for controlling the gain settings of the LNA, mixer and the PGA. The signal is sent as feedback to these elements.

After performing fine AGC, the receiver moves to the frame synchronization state 1070 during which frame synchronization is performed. After frame synchronization is successfully completed a frame synchronization found signal is generated and the receiver moves from the frame synchronization state 1070 to the data processing state 1080. If frame synchronization is not successfully completed, the receiver may move from the frame synchronization state 1070 to the idle state 1010. In an alternate embodiment, the receiver may move from the idle state 1010 to either the confirm state 1030 or to simultaneously the detect state 1020 and the confirm state 1030. Other embodiments of state diagrams of methods of operating the receiver may also be employed.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A method executed by circuitry of a signal processor in a radio frequency system for performing frame synchronization for a packet, comprising:
    correlating information of a plurality of pairs of symbols to obtain a series comprised of a plurality of first correlation results;
    correlating a plurality of pairs of the series comprised of the first correlation results to obtain a series comprised of a plurality of second correlation results; and
    examining the series comprised of the plurality of second correlation results for a pattern indicating a known location in a preamble of the packet.

2. The method of claim 1 wherein each of the plurality of pairs of the symbols is a symbol of the preamble of the packet.

3. The method of claim 2 wherein at least one of a plurality of the pairs of the symbols includes information representative of a synchronization sequence.

4. The method of claim 3 wherein the information representative of the synchronization sequence is modulated on a per symbol basis by a cover sequence.

5. The method of claim 4 wherein the pattern is indicative of changes in changes in the cover sequence.

6. The method of claim 1 wherein the plurality of pairs of symbols are received on a same sub-band of a time-frequency hopping communication scheme.

7. The method of claim 1 further comprising determining a validity of at least part of the series comprised of the plurality of first correlation results.

8. The method of claim 7 wherein determining the validity of at least part of the series comprised of the plurality of first correlation results comprises comparing a magnitude of the first correlation results to a threshold value.

9. The method of claim 8 wherein the plurality of first correlation results comprises, for each correlation, a real part and an imaginary part.

10. The method of claim 8 wherein comparing the magnitude of the first correlation results to the threshold value comprises comparing either the magnitude of a real part of the first correlation results or the magnitude of an imaginary part of the first correlation results to the threshold value.

11. The method of claim 1, wherein the examining operation comprises:
   extracting a plurality of signals indicative of corresponding signs of the plurality of the second correlation results;
   storing a predetermined number of the signals indicative of the signs of the plurality of the second correlation results; and
   comparing the stored signals with the pattern to determine if the pattern has been located.

12. A system for performing frame synchronization for a packet, comprising:
   means for correlating information of a plurality of pairs of symbols to obtain a series comprised of a plurality of first correlation results;
   means for correlating a plurality of pairs of the series comprised of the first correlation results to obtain a series comprised of a plurality of second correlation results; and
   means for examining the series comprised of the plurality of second correlation results for a pattern indicating a known location in a preamble of the packet.

13. The system of claim 12 wherein at least a plurality of the symbols include information representative of a synchronization sequence modulated on a per symbol basis by a cover sequence.

14. The system of claim 12 wherein the plurality of pairs of symbols are received on a same sub-band of a time-frequency hopping communication scheme.

15. The system of claim 12 wherein the plurality of first correlation results comprises, for each correlation, a real part and an imaginary part.

16. The system of claim 15 wherein means for comparing a magnitude of the first correlation results to a threshold value comprises means for comparing either the magnitude of a real part of the first correlation results or the magnitude of an imaginary part of the first correlation results to the threshold value.

17. A frame synchronization unit having blocks of circuitry for performing frame synchronization for a packet, the frame synchronization unit comprising:
   a first order correlation block configured to correlate information of a plurality of pairs of symbols to obtain a series comprised of a plurality of first correlation results;
   a second order correlation block configured to correlate a plurality of pairs of the series comprised of the plurality of the first correlation results to obtain a series comprised of a plurality of second correlation results; and
   a determination block configured to examine the series comprised of the plurality of second correlation results for a pattern indicating a known location in a preamble of the packet.

18. The frame synchronization unit of claim 17, wherein the determination block comprises:
   a sign block configured to extract a plurality of signals indicative of corresponding signs of the plurality of the second correlation results;
   a storage block configured to store a predetermined number of the signals indicative of the signs of the plurality of the second correlation results; and
   a comparator block configured to compare the stored signals with the pattern to determine if the pattern has been located.

19. The frame synchronization unit of claim 17, wherein the pattern is indicative of a manner in which the plurality of the pairs of symbols were transmitted.

20. The frame synchronization unit of claim 17, further comprising:
   a validity block configured to examine the series comprised of the plurality of the first correlation results to determine if the plurality of the first correlation results are valid.

21. The frame synchronization unit of claim 20, wherein the plurality of the first correlation results are valid when a sum of the plurality of first correlation results is greater than a predetermined validity threshold.

22. The frame synchronization unit of claim 20, further comprising:
   a frame synchronization decision block configured to determine that frame synchronization is obtained when:
      the determination block determines that the pattern indicates a known location in a preamble of the packet; and
      the validity block determines that the plurality of the first correlation results are valid.

23. A system for performing frame synchronization of a packet, the system comprising:
   a frame synchronization unit including:
   a first order correlation block configured to correlate information of a plurality of pairs of symbols to obtain a series comprised of a plurality of first correlation results;
   a second order correlation configured to correlate a plurality of pairs of the series comprised of the plurality of the first correlation results to obtain a series comprised of a plurality of second correlation results; and
   a determination block configured to examine the series comprised of the plurality of second correlation results for a pattern indicating a known location in a preamble of the packet.

24. The system of claim 23, wherein the determination block comprises:
   a sign block configured to extract a plurality of signals indicative of corresponding signs of the plurality of the second correlation results;
   a storage block configured to store a predetermined number of the signals indicative of the signs of the plurality of the second correlation results; and
   a comparator block configured to compare stored signals with the pattern to determine if the pattern has been located.

* * * * *